(12) United States Patent
McNally

(10) Patent No.: US 6,448,985 B1
(45) Date of Patent: Sep. 10, 2002

(54) DIRECTORY TREE USER INTERFACE HAVING SCROLLABLE SUBSECTIONS

(75) Inventor: Michael R. McNally, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,681

(22) Filed: Aug. 5, 1999

(51) Int. Cl.[7] .................................................. G06F 3/00
(52) U.S. Cl. ..................... 345/784; 345/786; 345/841; 345/830; 345/853; 345/854; 345/855
(58) Field of Search ................................. 345/853, 841, 345/738, 739, 784, 786, 788, 800, 810, 855, 854, 828, 830

(56) References Cited

U.S. PATENT DOCUMENTS

| 4,710,763 | A | | 12/1987 | Franke et al. ................... 345/10 |
|---|---|---|---|---|
| 5,394,522 | A | | 2/1995 | Sanchez-Frank et al. ... 345/735 |
| 5,432,897 | A | | 7/1995 | Tatsumi et al. ............. 345/440 |
| 5,528,735 | A | | 6/1996 | Strasnick et al. ........... 345/427 |
| 5,644,736 | A | * | 7/1997 | Healy et al. ................ 345/784 |
| 5,644,740 | A | * | 7/1997 | Kiuchi ........................ 345/854 |
| 5,701,137 | A | * | 12/1997 | Kiernan et al. ............. 345/119 |
| 5,714,971 | A | | 2/1998 | Shalit et al. ................ 345/804 |
| 5,751,914 | A | | 5/1998 | Coley et al. ................... 706/47 |
| 5,905,498 | A | * | 5/1999 | Diament ...................... 345/705 |
| 5,917,492 | A | * | 6/1999 | Bereiter et al. ............. 345/854 |
| 5,987,469 | A | * | 11/1999 | Lewis et al. ................ 707/102 |
| 6,028,602 | A | * | 2/2000 | Weidenfeller et al. ...... 345/781 |
| 6,141,007 | A | * | 10/2000 | Lebling et al. ............. 345/764 |

OTHER PUBLICATIONS

Technical Disclosure Bulletin, v39 n8 08–96 p81–84, Tree Splitter.

* cited by examiner

Primary Examiner—Raymond J. Bayerl
Assistant Examiner—Cuong T. Thai
(74) Attorney, Agent, or Firm—Jeffrey S. LaBaw

(57) ABSTRACT

A directory tree is displayed and a command is detected to expand a subsection of the directory tree. It is determined whether certain criteria are met for displaying the subsection in a scrollable region within the directory tree. The subsection is presented in the scrollable region if the criteria are met, so that a greater number of members of the directory tree outside the subsection can be displayed within the graphical user interface. Some of the criteria which can be used to determine whether a scrollable subsection should be used include: whether the subsection has more than a predetermined number of members; whether all members of a root node directory of the tree can be displayed if the subsection is fully expanded; and whether the subsection is at a predetermined depth in the directory tree structure.

26 Claims, 12 Drawing Sheets

DIRECTORY TREE USER INTERFACE HAVING SCROLLABLE SUBSECTIONS

BACKGROUND OF THE INVENTION

The present invention relates in general to a graphical user interface for a computer system. In particular, it relates to a directory tree interface. More particularly, the present invention relates to a method and system for scrollable sections of a directory tree.

It is common to provide a graphical user interface (GUI) for user interaction with a computer system. The GUI presents information about the computer and its components, both hardware and software to the user. Through the user of graphical objects such as windows, icons and controls, the user is shown what software modules are available for selection and execution. One of the more prevalent GUIs is a directory tree structure. A directory tree allows the software designer or a user to organize software applications or files which have related subject matter or a common theme. By representing software applications or hardware devices as nodes or members in a directory tree, the hierarchical configuration can be used to show logical groupings and relationships between logical groupings of files or devices.

One prevalent use for a directory tree is as a graphic display which lists the directories and subdirectories which are stored in electronically retrievable media such as a disk drive. A directory is a cataloging mechanism for files and subordinate directories often referred to as subdirectories. User selectable items are thus presented in a "tree" structure, hence the term "directory tree". Nonetheless, a directory tree need not be used solely for portraying an organized list of directories and subdirectories, but can be used for any type of files, logical file system objects, software tools or object attributes as well as representations of hardware. Within the directory tree structure, a user can select and manipulate files represented by members within the tree utilizing a mouse, keyboard or other input device. User selection via a mouse can be accomplished by "pointing and clicking" on a selectable feature on the computer display.

The directory tree may represent software and hardware which is not physically part of the user's computer system, but is available via a network. Users of a directory tree need not be aware of which physical system retrieves or implements a file in response to the selection of an icon. Directory trees provide a flexible means for selection of software tools because portions of files, file management systems and software tools might be physically in remote or different locations within a computer memory structure.

While the directory tree structure is useful and is quite prevalent within the operating systems and applications of most present day computers, when the tree structure is large, it can become unwieldy for a user to manipulate and understand the directory structure. For example, in the process of organizing a directory tree, one of the more common operations performed by a user is to drag and drop an icon representing a file from a source container, or source position in the tree, into a desired target subdirectory. When the directory and/or subdirectories are large, the tree expands to a long flat file. It is often difficult to have both the source and target locations on the display at the same time. Therefore, process of organizing a large directory tree is more time consuming than is desirable.

The existing directory tree controls and editing features are limited in function. Currently, most trees have a control which allows a given subdirectory to be hidden or collapsed from view. This operation tends to be an "all or nothing" choice of views. Where the desired target is in a large subdirectory, this is less than ideal. The majority of items within the target subdirectory may be irrelevant to a current task, yet individual members cannot be hidden or removed from sight. This takes up valuable display space and necessitates more manipulation by the user to scroll through irrelevant entries.

The lack of good directory tree controls is becoming a significant problem for users as the number of files and directories within a computer that a user must manage is growing at a significant rate. The large memory capacity now available in modern personal computers has been utilized by application writers to create software with an increasing number of components. Further, the linking of external memory through interconnected computers has further increased the proliferation of the number of files, software tools and other system objects which are accessible to and often displayed in a directory tree format to a user.

It would be therefore be desirable to provide a computer user with an improved a directory tree interface that allows the user to see both the target and source locations for a given file relocation. It would also be desirable that the directory tree interface present the hierarchical structure of the tree to provide the understanding of the directory. The interface must be flexible enough to allow a user to edit one section of a directory tree to perform a specific task, and then, after the specific task is complete, rearrange the directory tree to show other portions of the directory tree.

Hence, an improved method for making a directory tree more manageable would be helpful. A directory tree management system having functionality which is tightly coupled or substantially similar in operation to the existing graphical user interface control features is also desirable.

SUMMARY OF THE INVENTION

It is therefore one object of the present invention to provide an improved directory tree user interface.

It is another object of the present invention to use similar and understandable procedures existing graphical user interfaces so that the function the improved directory tree interface would be easily understood.

It is yet another object of the present invention to more easily add and rearrange objects in the directory tree.

The foregoing objects are achieved by managing a directory tree within a graphical user interface. The directory tree is displayed and a command is detected to expand a subsection of the directory tree. It is determined whether certain criteria are met for displaying the subsection in a scrollable region within the directory tree. The subsection is presented in the scrollable region if the criteria are met, so that a greater number of members of the directory tree outside the subsection can be displayed within the graphical user interface. Some of the criteria which can be used to determine whether a scrollable subsection should be used include: whether the subsection has more than a predetermined number of members; whether all members of a root node directory of the tree can be displayed if the subsection is fully expanded; and whether the subsection is at a predetermined depth in the directory tree structure.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 1:
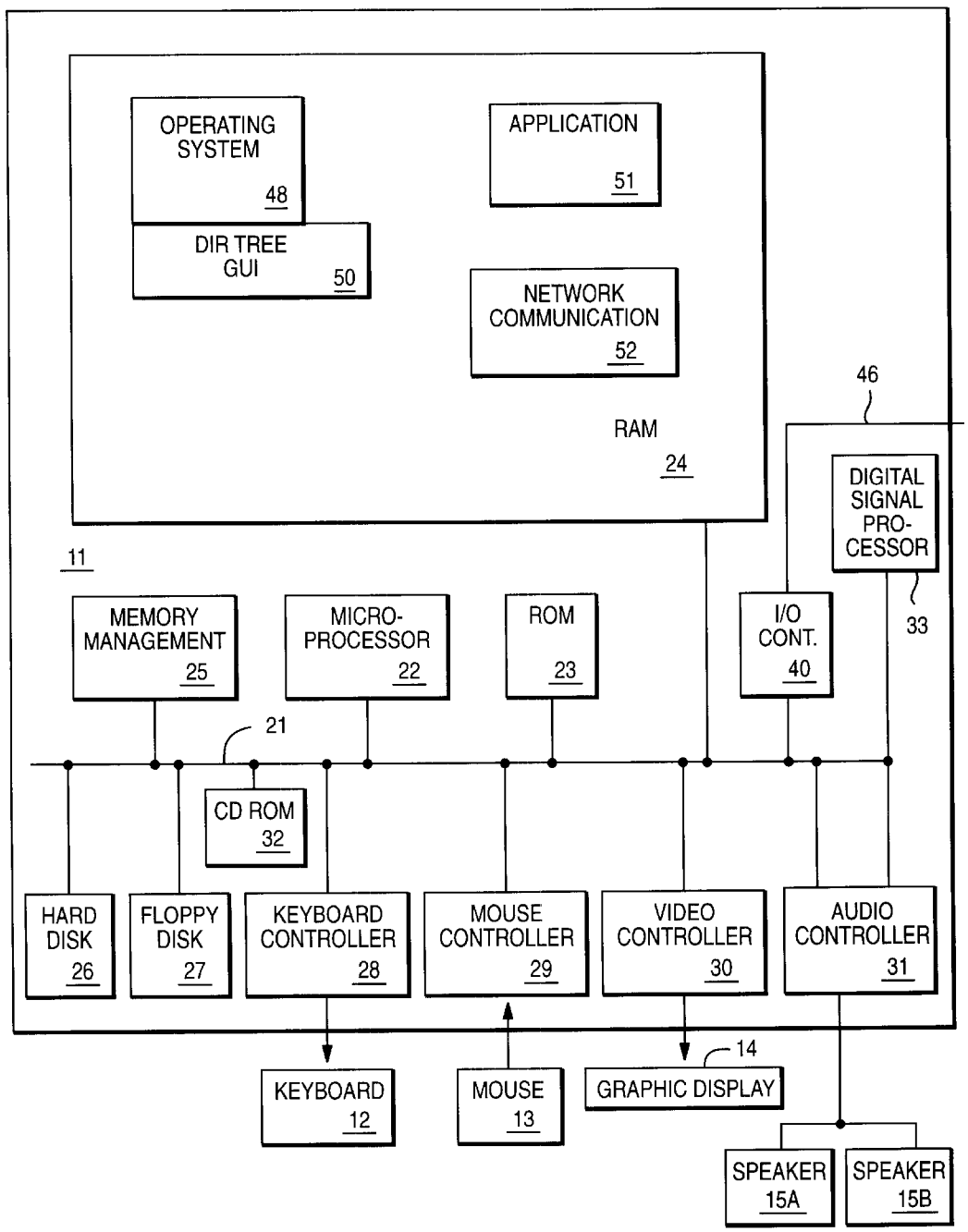
FIG. 1 illustrates a conventional computer system which could be utilized to implement the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. Typically, a microprocessor in an IBM compatible computer is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM might be used by the present invention. Other RISC chips made by Hewlett Packard, Sun, Motorola and others may be used in the specific computer.

The ROM 23 contains among other code the Basic Input-Output system (BIOS) which controls basic hardware operations such as the interaction of the processor with the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM drive 32 also coupled to the system bus 21 is used to store a large program or amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted in a transmission means such as a local area network or a wide area network such as the Internet when desired by the user. One skilled in the art knows that storage or transmission of the computer program product changes the medium electrically, magnetically, or chemically so that the medium carries computer readable information.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

Figure 2A:
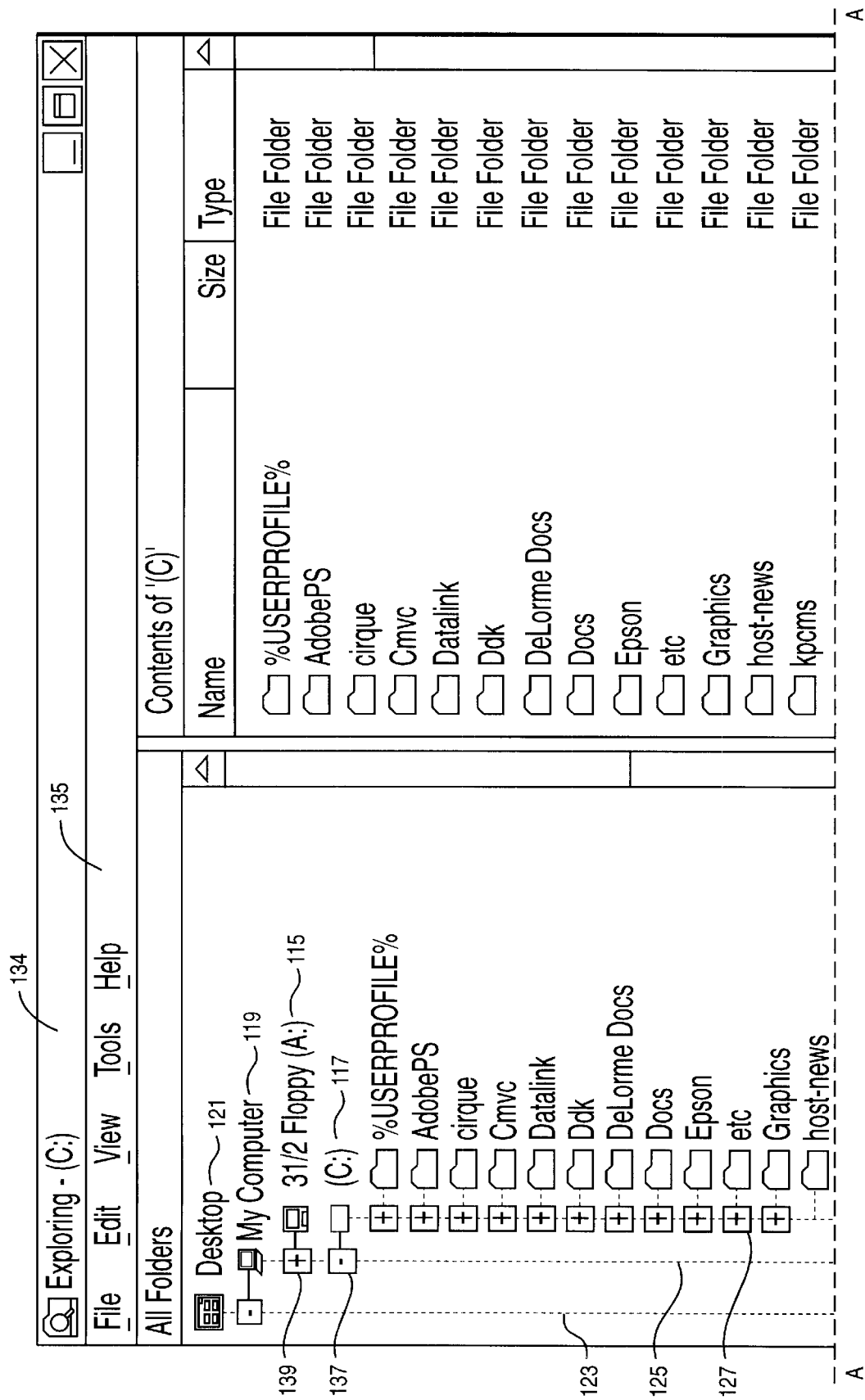
FIGS. 2A–2B depict conventional directory tree selections and icon selections displayed within a graphical user interface.
Figure 2B:
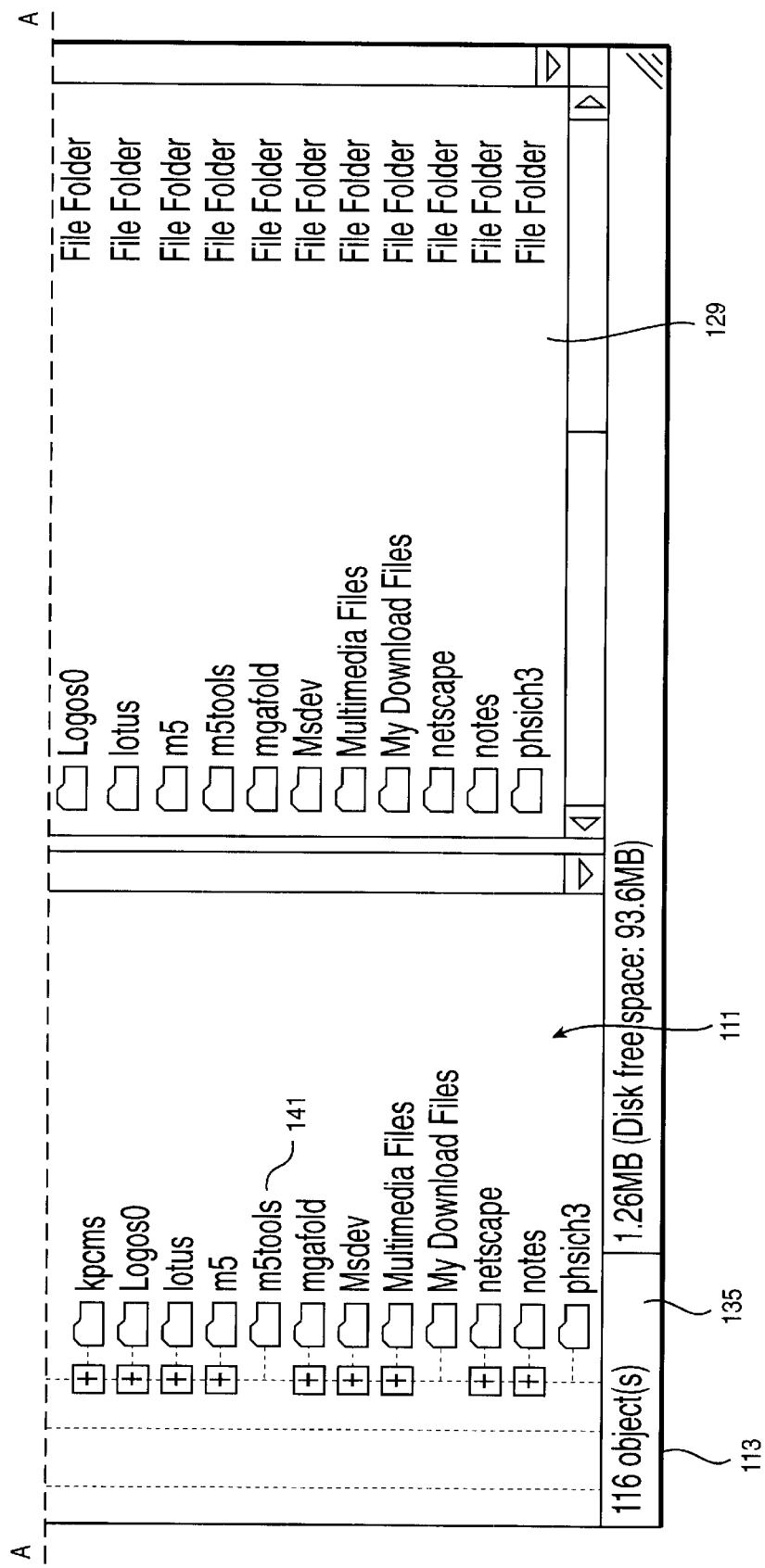

As is mentioned above, existing directory tree editing functions utilize tedious control functions and provide less than perfect feedback to a user. In FIGS. 2A–2B, directory tree 100 is illustrated in a typical GUI embodiment. Directory tree 100 is displayed within left sub-window 111 of explorer window 113. Directory trees are used by the operating system of a computer as purchased and directory trees can be automatically created when software is loaded into the computer. A user can also create directory trees by creating a directory, giving the directory a title, and then adding subdirectories, files, or software applications into the directory. Directories are often referred to as folders.

Subdirectories of a directory, typically appear indented from the directory title in an "outline" form as depicted in FIGS. 2A–2B. Subdirectories themselves may have subdirectories. For example, the floppy drive A: subdirectory 115 and hard drive C: subdirectory 117 are subdirectories of the My Computer subdirectory 119 which itself a subdirectory of desktop directory 121. The subdirectories which are placed into a folder typically are "linked" by a vertical dotted line which can be referred to as a linking indicator. In FIGS. 2A–2B, directories and subdirectories are linked by linking indicators 123, 125, and 127. In the right sub-window 129, the contents of the hard drive subdirectory are shown in a detailed view, one of the alternative views available in a modern operating system.

A folder such as "Desktop" 121 which is attached to outer linking indicator 123 is often called a root of the directory tree. The node provides an anchor for attaching a group of subdirectories in a hierarchical format on a directory tree. As shown, the shortcoming in the depicted "Explorer" embodiment, as well as all known GUIs which display directory trees, is that when the directories and/or subdirectories get large the user cannot effectively manipulate the contents as desired. Note that the subdirectory for the hard drive C: can not be completely displayed; opening lower level subdirectories will further exacerbate this problem. Further, the overall structure of the desktop directory 121 is obscured; the length of the hard drive subdirectory prevents all of the immediate subdirectories from being displayed.

Thus, only a fraction of the directories and subdirectories stored in the computer can be displayed at any given time due to the display area constraints. Window features such as title bar 131, menu bar 133 and information fields 135, while useful for other purposes, further cut down on the screen area or space available to display directories and subdirectories on a computer screen.

Typically, user input is accomplished using a pointing device, such as a mouse, which controls a graphical pointer icon on a display. The graphical pointer icon provides user feedback such that a user can point to a desired selection utilizing a pointing device. When the graphical pointer icon is properly positioned, a button can be pressed to make a selection. This is called by those having skill in the art "pointing and clicking" on the selection.

Existing directory tree interfaces utilize the + and − icons to expand and collapse entire directories. For example, all files which are part of the hard drive C: subdirectory 117 can be removed from view by selecting − icon 137 with the mouse pointer. The + and − icons also provide an indication of whether the directory is in a collapsed state or in an expanded state. The + icon 139 beside the floppy drive subdirectory 115 indicates that there are members within the subdirectory which could be displayed in the tree by clicking on the icon. When neither symbol appears to the left of a directory, no subdirectories exist as a subset of the directory, e.g., m5tools 141. However, utilizing the + or − icons to display or collapse a subdirectory is an all-or-nothing choice. All of the members of the subdirectory (display space allowing) or none of the members are displayed. There is no option to display a portion of the subdirectory.

The reason that this is a problem can be readily seen by reference to FIG. 2. Suppose the user wished to move a file from the floppy disk to the phsrch 3 subdirectory 143 on his hard drive. Once the user clicks on the + icon 139 to expand the floppy drive subdirectory 115, so that he may disappear from view. In this particular example, the intervening subdirectories on the hard drive are of no immediate interest, yet they take up valuable display space removing the relevant subdirectory to the move operation, i.e. phsrch 3, from the screen.

In the illustrated embodiment, right sub-window 129 provides icons for user selection. These icons provides an alternate selection means which when selected have the identical functionality as selecting nodes in the directory tree 100. Thus, the icons in the right subwindow 129 can be selected to effect editing functions within the directory tree.

The present invention solves this important problem.

Figure 3A:
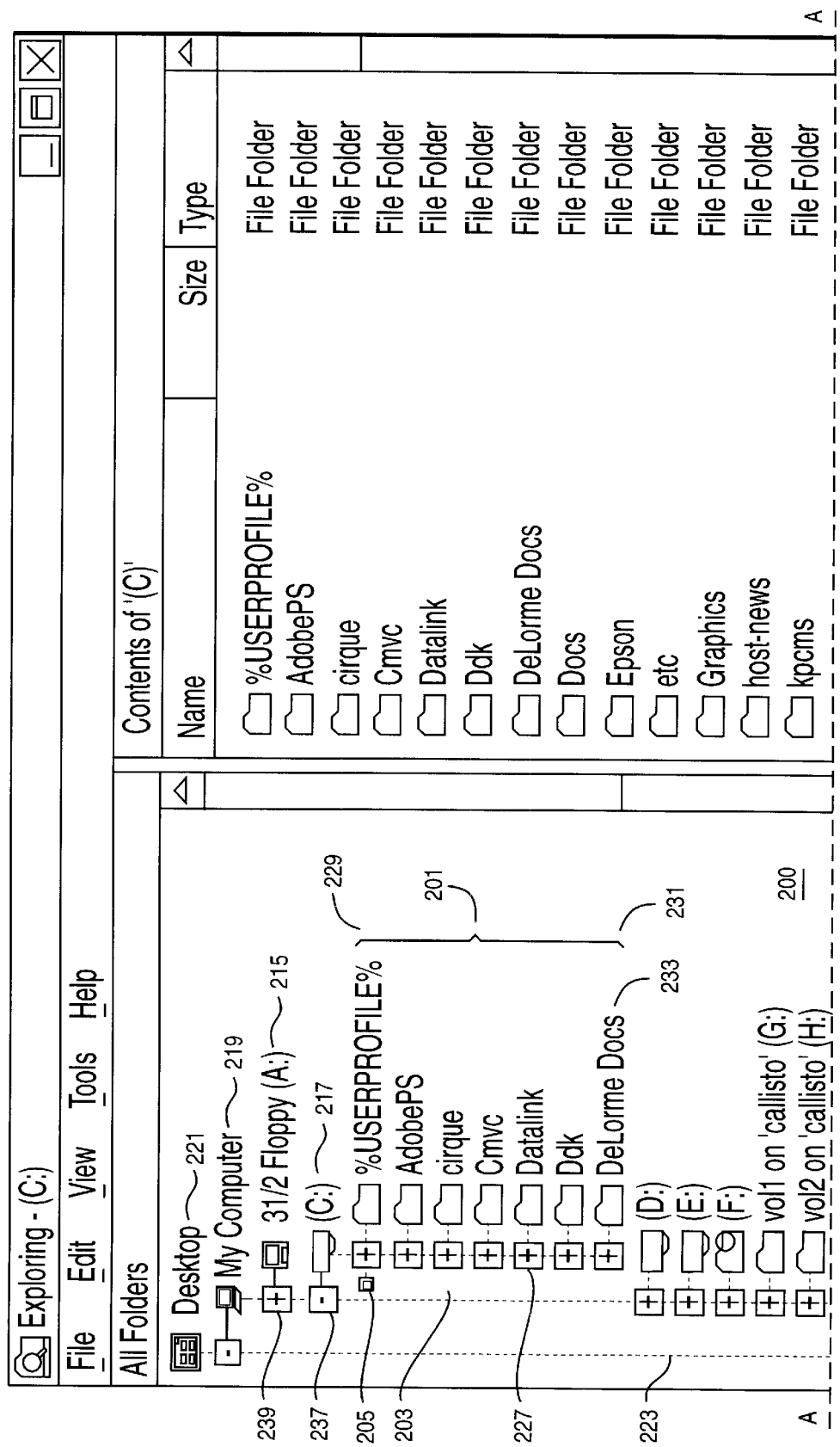
FIGS. 3A–6B illustrate a directory tree interface in accordance with one implementation of the present invention.
Figure 3B:
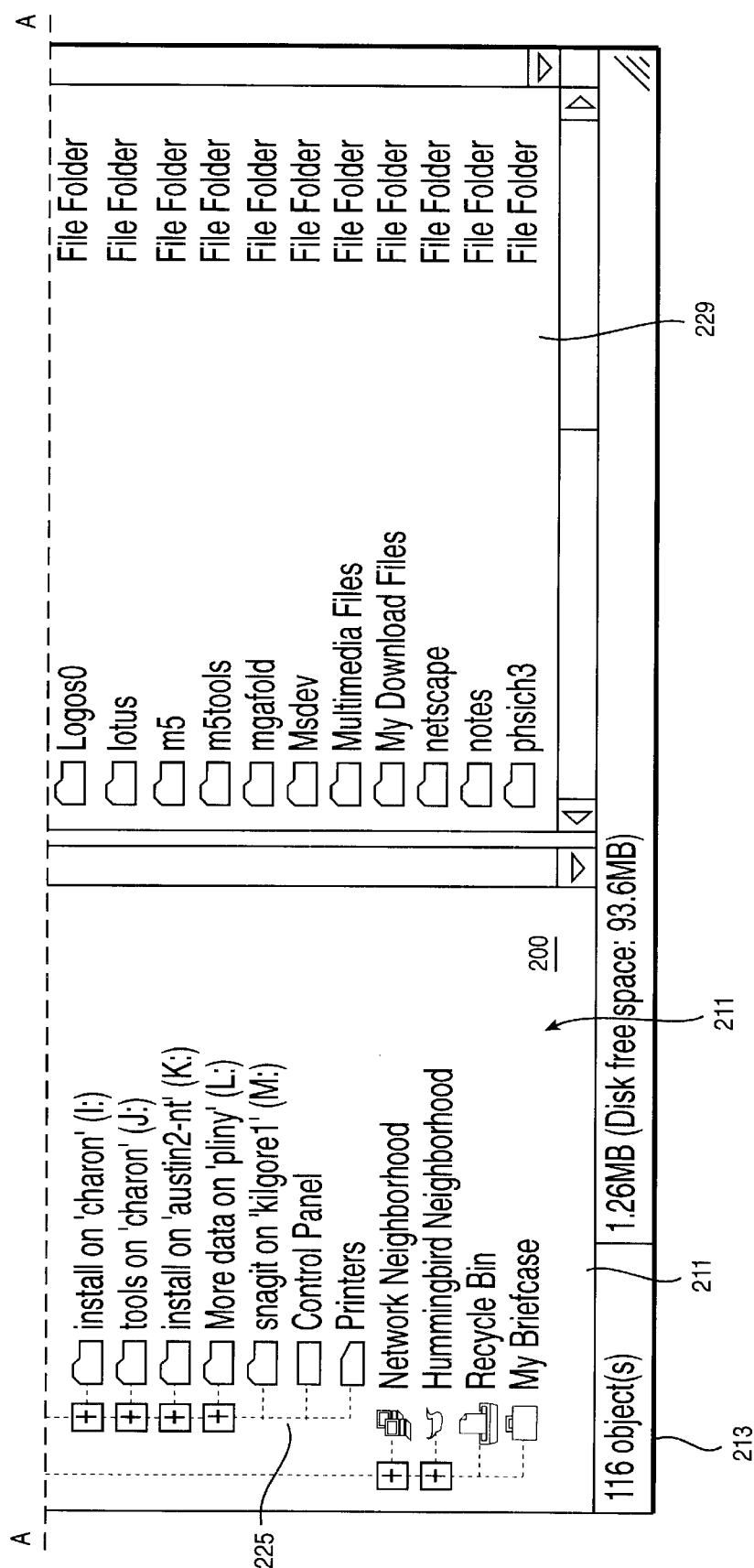

Referring to FIGS. 3A–3B, an improved directory tree interface 200 is depicted. In accordance with the present invention, within the directory tree 200 a scrollable region 201 is presented within scrollable window 211. Scrollable region 201 is scrolled by interaction of the mouse pointer icon with scroll bar 203.

The scrollable region 201 is created when the user clicks on the + icon (not shown) associated with the hard drive subdirectory 217 using the graphical pointer icon. In general, the invention is invoked when a level, i.e. the subdirectory, of a hierarchical structure, i.e. the directory tree, is sought to be expanded. Rather than expanding the entire subdirectory as shown in FIGS. 2A–2B, only part of the hard drive subdirectory 217 is shown in the scrollable region 201. As shown by the slider 205 in the scroll bar 203, only the first seven subdirectory members are shown in the scrollable region 201. By clicking and dragging the slider 205, other entries within the hard drive subdirectory can be shown, without moving the directory tree as a whole. Note also that the entire set of directory members of the desktop directory is presented giving the user a much better idea of the software and hardware components accessible to his computer.

Note that the scrollable region has been designed to require no more space than would normally be required in a conventional directory tree with a like number of members. Only the scroll bar and slider are added. However, since this is accomplished in the space between the linking indicators 225 and 227, no loss of display space is incurred. Features such as title bars and so forth are omitted. Even the scroll bar could be omitted, as scrolling could be accomplished by clicking on top and bottom lines 229 and 231. However, since this is a different metaphor to that which users are accustomed, it is less preferred.

Other features to the scrollable region can be added in alternative embodiments. While it is expected that bounding the region with lines 229 and 231 in the presence of scroll bar 203 will make it intuitive to the user that region 201 is scrollable, color could be added to the background and the subdirectory members within the region 201 to denote that the behavior of the region is different from the rest of the directory tree. In addition, the text of subdirectory entries could be changed to indicate the presence of more members. For example, the "Delorme Docs" text could be replaced with "Delorme Docs (more \/)" or simply "(more \/)" where the "\/" is an arrow which indicates the direction in which additional members can be found.

A number of factors can be used to determine the size, i.e. number of subdirectory members, of the scrollable region and whether to make a subdirectory scrollable at all. One determinant can be how many subdirectory members can be displayed while still displaying all of the immediate subdirectories of the root directory. Note that in the figure that all of the immediate subdirectories of the desktop directory are displayed. Thus, seven subdirectory members can be displayed within the scrollable region 201. If the hard drive directory 217 had seven or fewer members, there would be no need to incur the additional overhead of creating the scrollable region.

Obviously, the size of the subdirectory is also a factor to be considered. Likewise, the size of the display space available to the entire directory tree is a factor. Instead of a rule that all of the immediate subdirectories of the root directory should be displayed, alternatively some ratio of the number of subdirectory members to be displayed within the scrollable area versus the number of directory members within the tree at large could be maintained, e.g., 25%. A ratio might be useful in a situation where the immediate subdirectories of the root directory are too numerous to be displayed. This ratio could expanded if space was available within the display space, i.e. there were relatively few immediate subdirectories.

A simple rule would be to always invoke the scrollable region if the number of subdirectory members exceeded a given number, e.g., five, irrespective of the other members of the directory structure. Thus, subdirectories with six members or more would always be displayed within a scrollable region, while those with five or fewer are displayed in the conventional manner.

It is preferable to have a minimum number of subdirectory members, e.g., three, within the scrollable region. Too few subdirectory members might fail to intuitively express the idea that the scrollable region was indeed scrollable. It would also make manipulation of the scroll bar slider more difficult. Nonetheless, it would be possible to have a single subdirectory member displayed within the scrollable region if sufficient precision can be employed with the computer input devices.

In the preferred embodiment, clicking on the "−" icon would close the scrollable region similar to the operation in the prior art directory tree which would close the entire subdirectory.

Figure 4A:
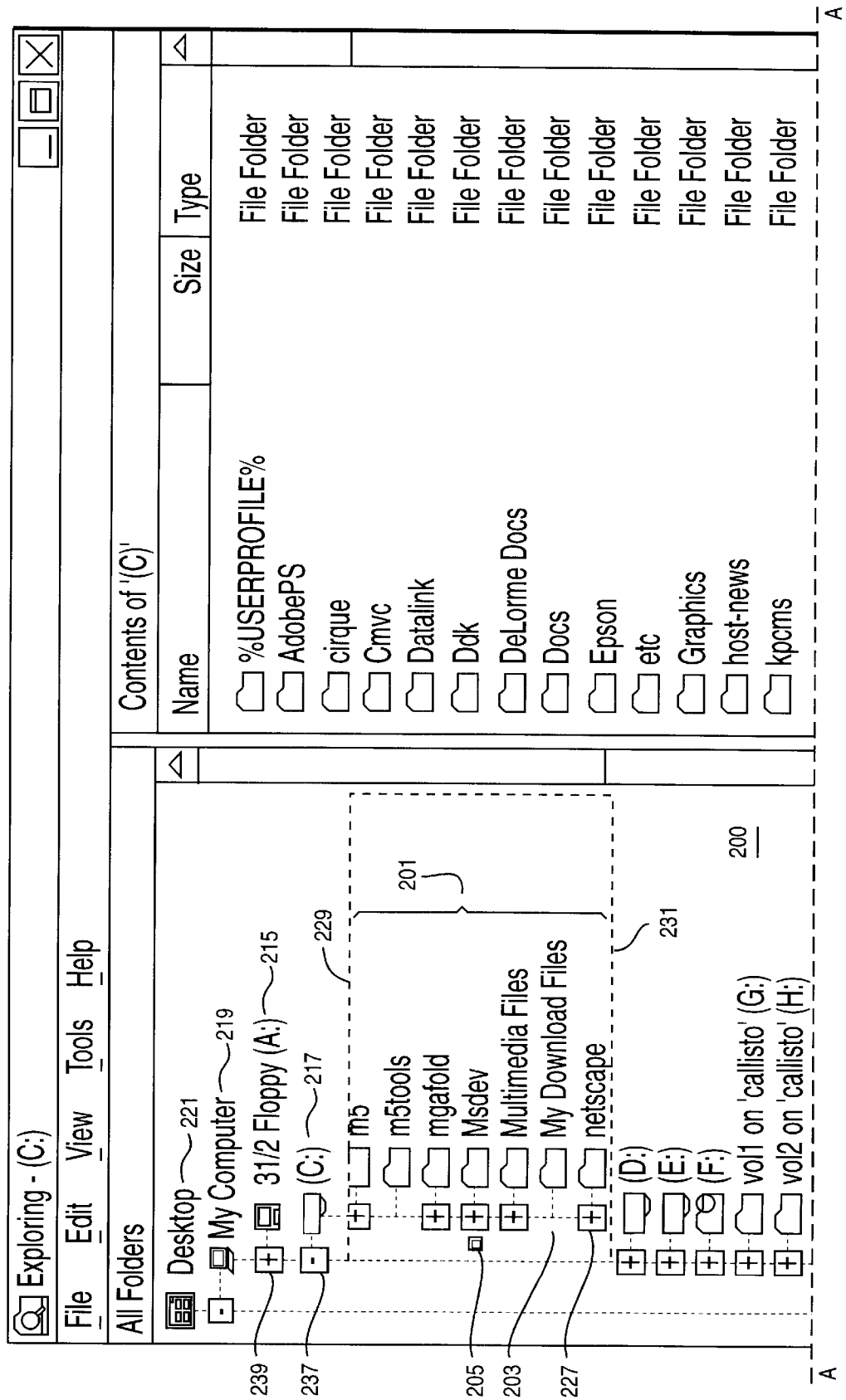
Figure 4B:
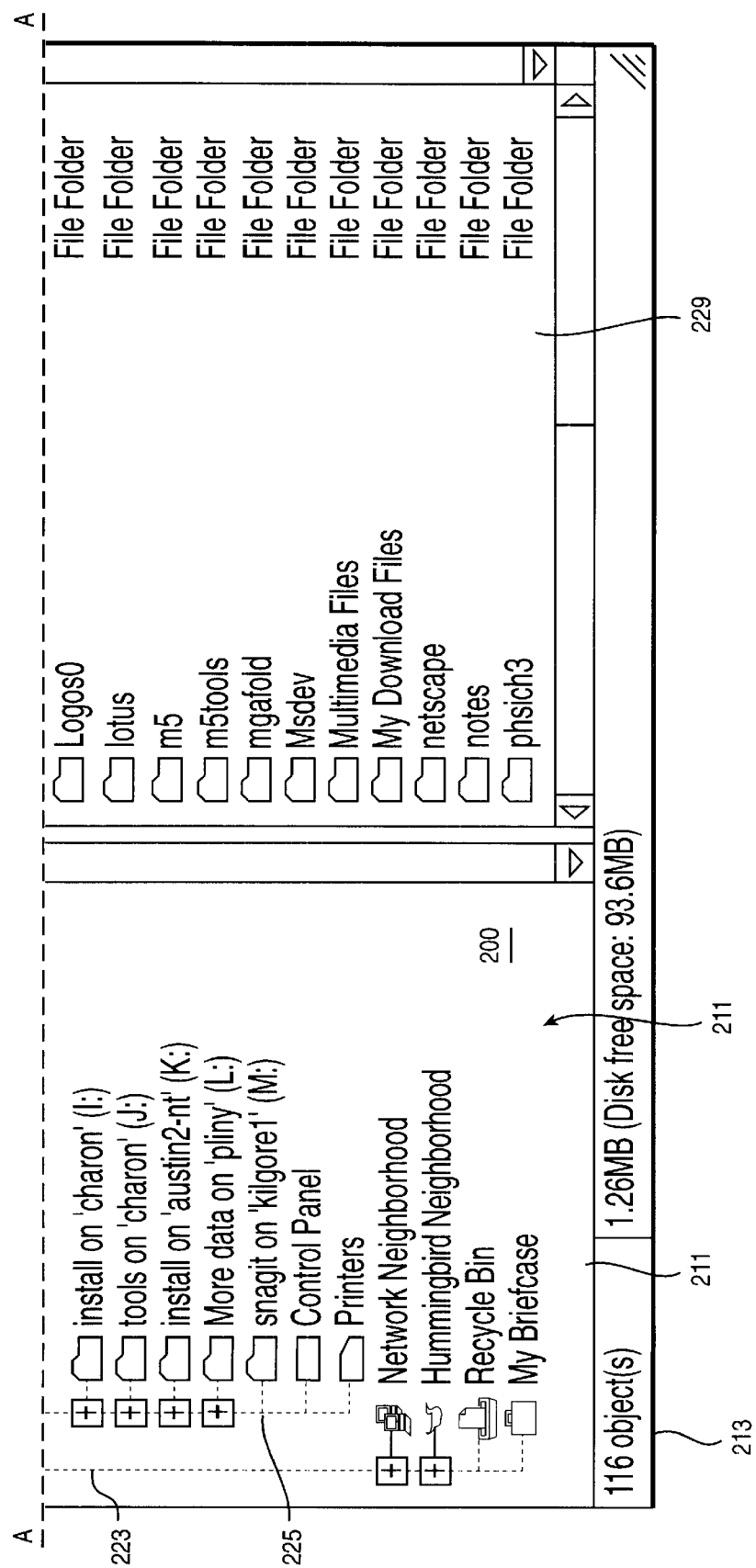

Referring now to FIGS. 4B–4B, the directory tree user interface is shown after the user has scrolled the scrollable region 201 through the use of the scroll bar 203. The reader will notice that the subdirectory members within the region 201 are different than that in FIGS. 3A–3B. Also, the slider 205 is in a different position within the scroll bar 203. The reader will also notice that the directory tree 200 as a whole has not moved, i.e. the members outside the scrollable region, so that the immediate directory members of the root directory are still presented. On the other hand, scrolling the directory tree within the scrollable window 211 using main scroll bar 241 moves the position of the scrollable region in lockstep with the movement of the directory tree.

Figure 5A:
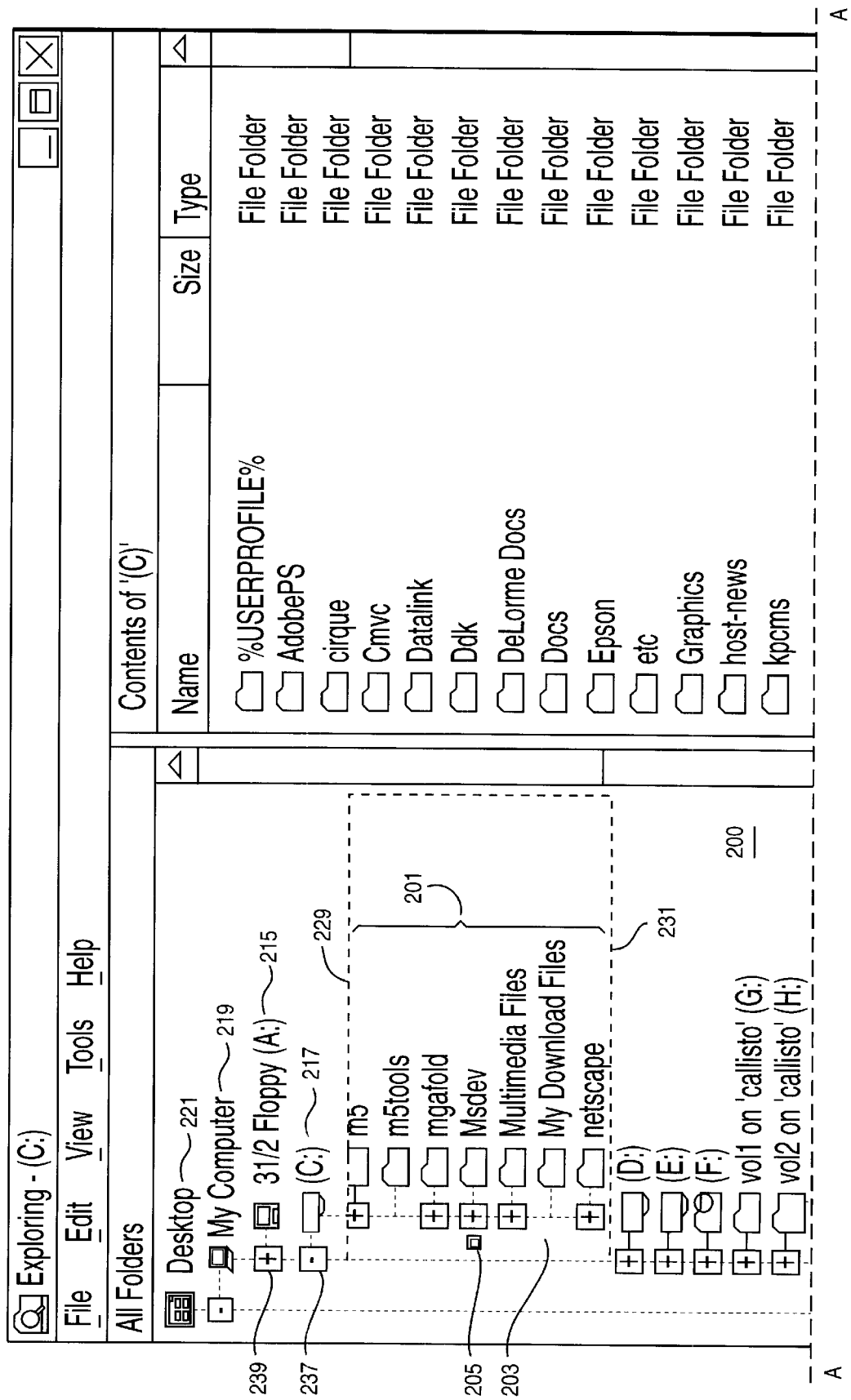
Figure 5B:
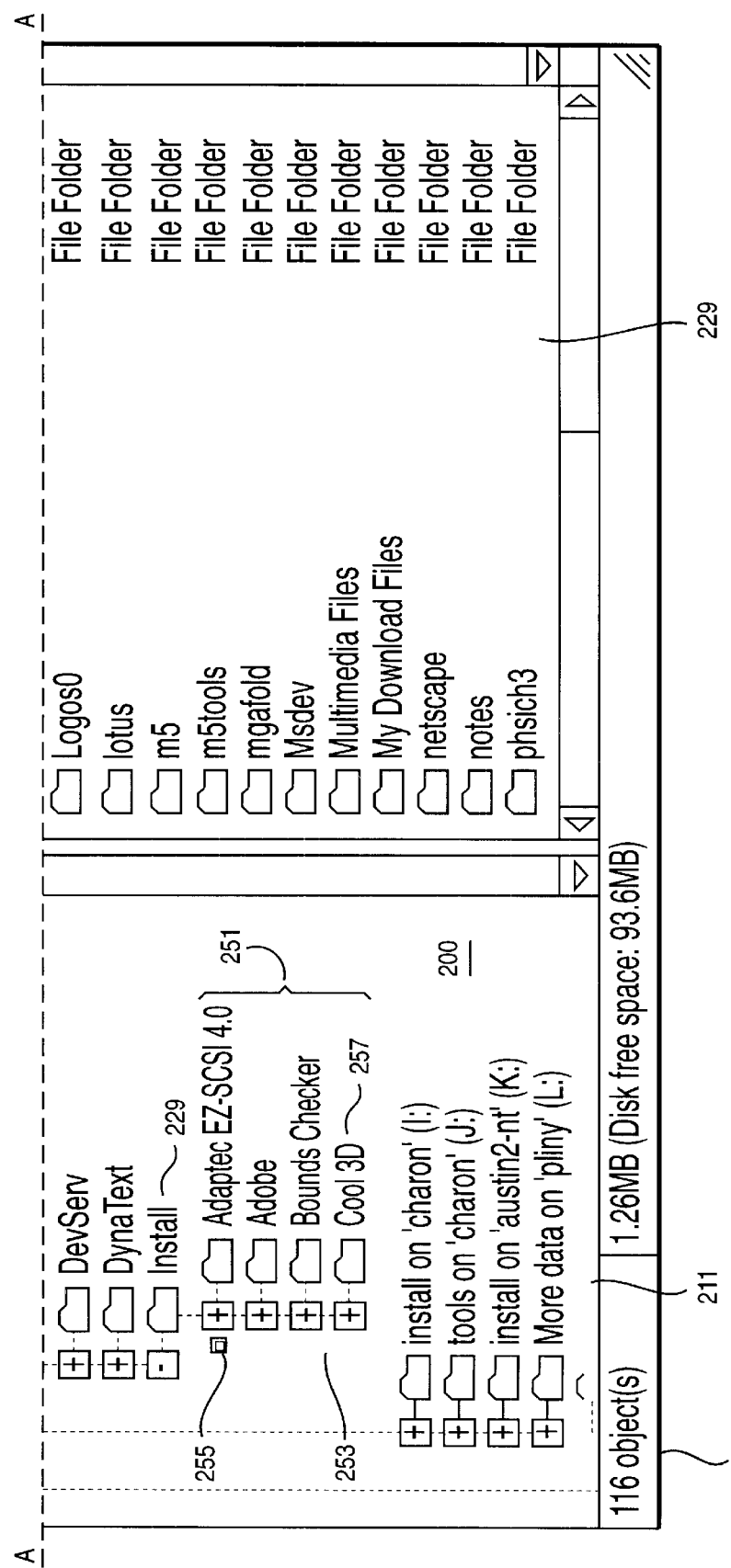

Referring now to FIGS. 5A–5B, the directory tree interface is shown after the user has opened a new scrollable region 251 within the directory tree with its own scroll bar 253 and slider 255. This figure shows that more than one scrollable subdirectory can be opened within the directory tree at one time. This is especially convenient when the files which need to be moved are hierarchically deep within the directory structure. The scroll bars can be adjusted so that the relevant files and subdirectories can be displayed simultaneously. With large and complex directories, this would have been impossible using the prior art approach.

Although not shown, in an alternative embodiment, it might be possible to have a scrollable region within a scrollable region. For example, suppose that a user which to expand the "Cool 3D" 257 subdirectory within scrollable region 251. However, this is believed to be potentially confusing to the user. What is preferred is that if the user interface code determines that a second scrollable region is to added within a first scrollable region, the first scrollable region is collapsed back to the node on which it depends. In this case, region 251 would be collapsed to "Cool 3D" 257 which would depend on "Install" 259.

Figure 6A:
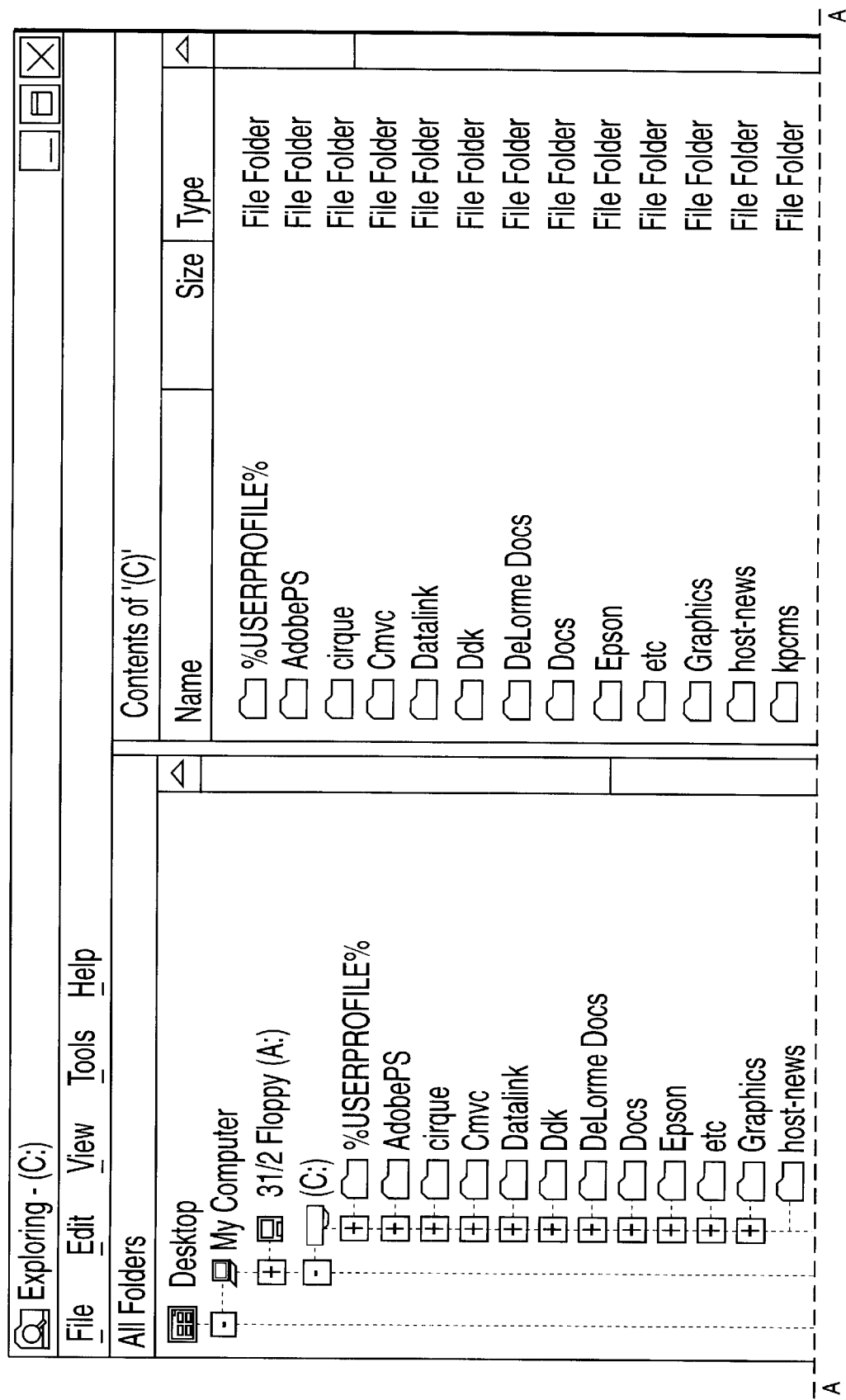
Figure 6B:
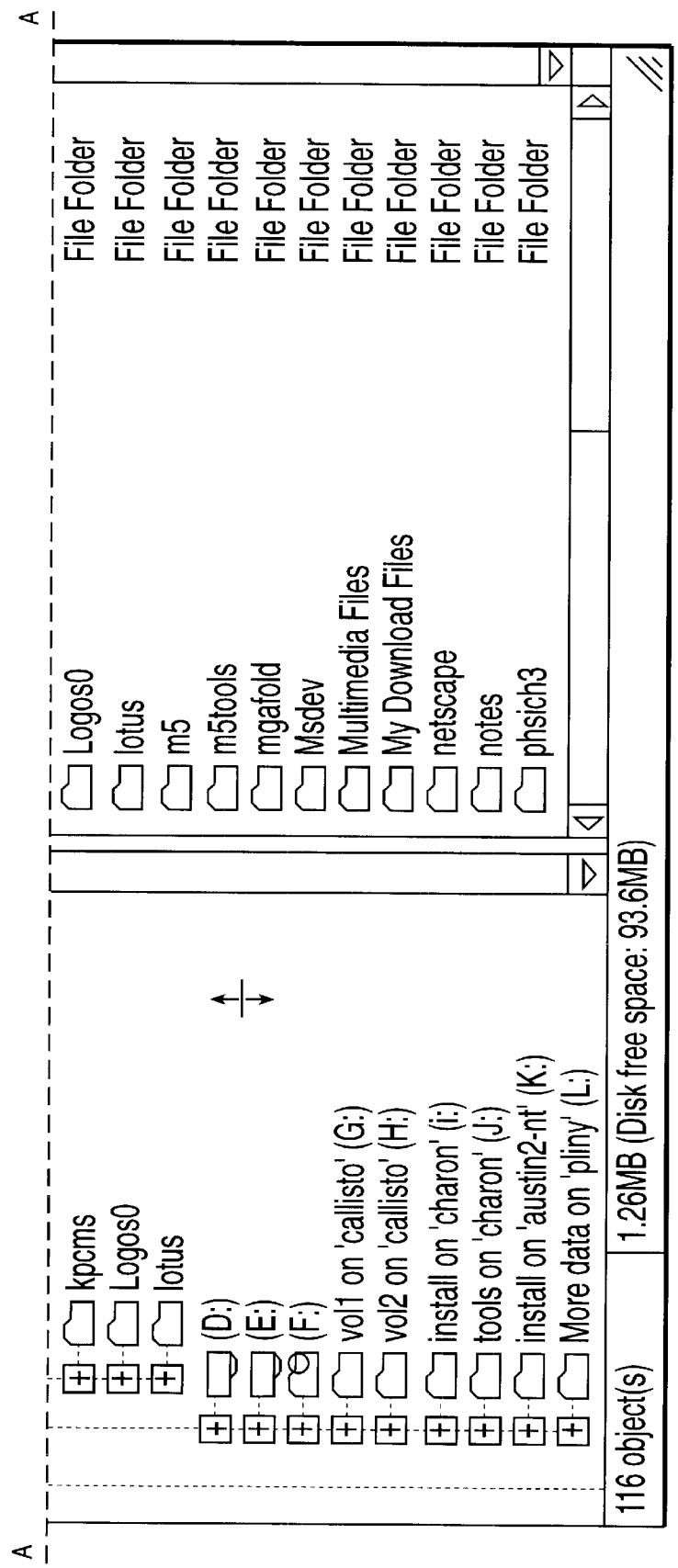

Referring now to FIGS. 6A–6B, an alternative embodiment of the invention allows a user to change the size of the scrollable region 201 and therefore the number of the subdirectory members displayed therein. As shown, pointer icon 271 has been moved to bottom line 231 where it has changed appearance to the split-pane resize pointer icon. The user grabbed the bottom line 231 and resized the size of the scrollable region using a drag and drop operation. This is similar to the known process of resizing a window. Unlike the typical window resize, however, the remainder of the directory tree is moved downward so that it is not obscured. Notice that the folder icon 273 for the D: partition of the hard drive is still visible. In this embodiment, the scrollable region would first be presented according to some default criteria such as those discussed above. If the size of the region was not satisfactory to the user due to the operation he was planning, he could resize it.

Although not shown, the directory tree interface of the present invention in one preferred embodiment presents a dialog box to the user if an "advanced properties" control is selected. Using the dialog box, the user could toggle the scrollable region behavior on and off. If the behavior was turned off, the directory tree structure would behave in the prior art manner. The advanced properties dialog could also allow the user to specify the size of the scrollable region according to his own preferences and experience.

Figure 7:
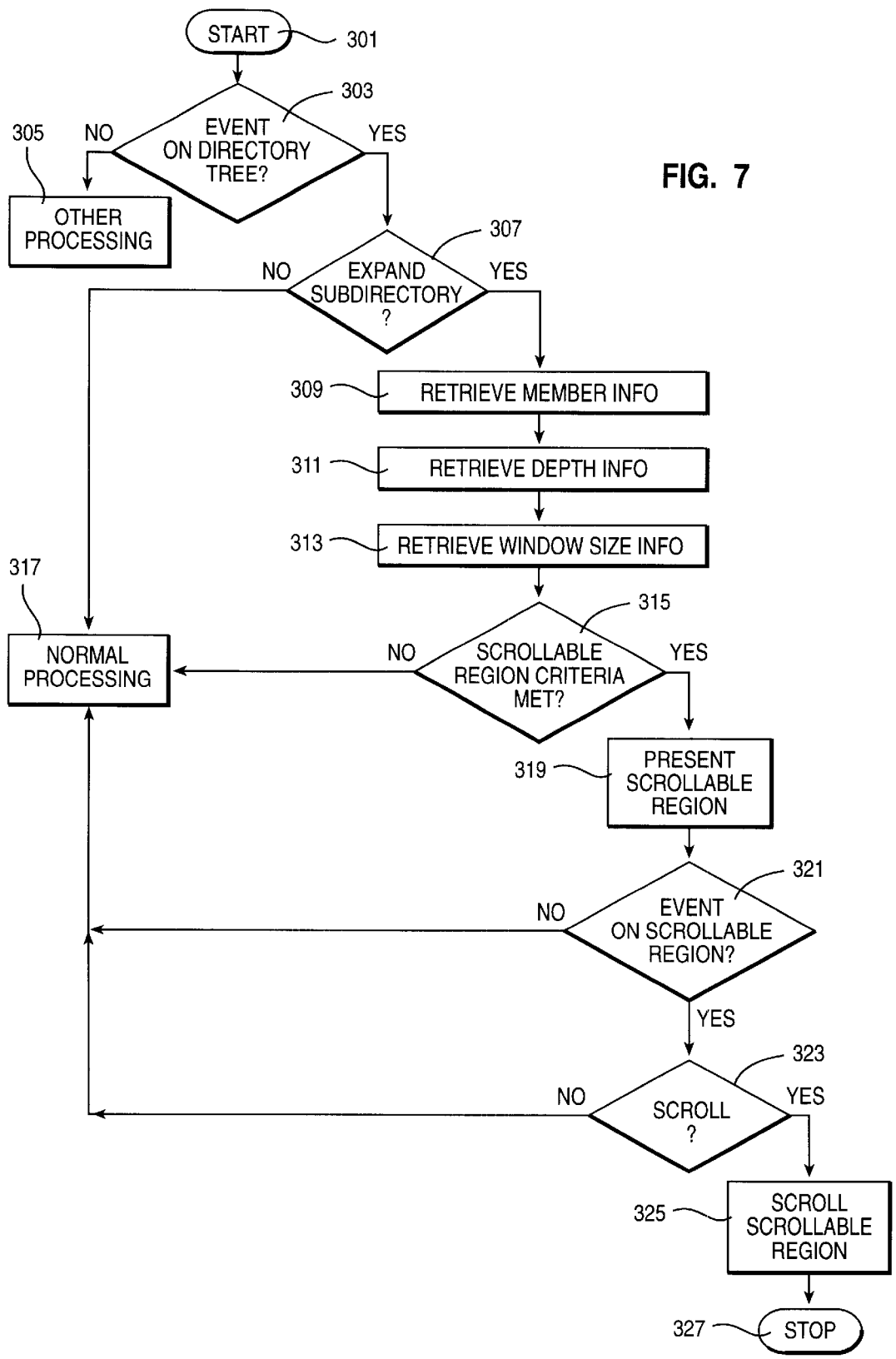
FIG. 7 is a high level flow diagram which provides steps of a method in accordance with one implementation of the present invention.

A very high level flow diagram is shown in FIG. 7. The process starts in step 301 when the directory tree is displayed. In step 303, an event is detected and a test is performed to determine whether it is an event directed at the directory tree or some other part of the interface. In the event is not directed at the tree, other processing, step 305, takes place. If the event was directed at the directory tree, another test is performed to determine whether it is a user input to expand a subdirectory, step 307. If not, normal processing related to the directory tree is performed, step 317.

If the event was to expand a subdirectory, for example, the user clicks on the + icon, data on the members, e.g., names, associated icons, number is retrieved, in step 309. The depth of the subdirectory within the directory tree is retrieved in step 311. In one preferred embodiment, a scrollable region is not used to present the immediate subdirectories of the root node since the window in which the tree is presented already has a scroll bar. A second would be superfluous. The size of the window in which the directory is retrieved in step 313. There is no particular importance to the order in which this information is retrieved; some of the data listed may not be retrieved if it is not relevant to the decision whether to present a scrollable region for the subdirectory in the directory tree. If a scrollable region is presented if the subdirectory exceeds five members, no matter what the depth and window size data is irrelevant. Other information could be retrieved for other decision criteria.

Next, in step 315, the decision whether to present a scrollable region is made. Many of the possible decision criteria have been discussed above, e.g., number of members in the subdirectory, whether the overall directory tree structure is to be presented if possible, depth of the subdirectory in the directory tree. The particular tests performed in step 315 will thus vary according to the criteria set by the user interface designer. This step could comprise several different tests depending upon the criteria used by the interface designer.

If the decision criteria are not met, normal processing occurs, step 317, i.e. presenting the subdirectory with all of its members. Presuming, however, that the scrollable region criteria are met, in step 319, the subdirectory is presented within a scrollable region as shown in FIGS. 3A–6B. The creation of the scroll bar and other features of the scrollable region are part of this step.

In step 321, a test is performed to determine whether there is an event in the scrollable region. If not, normal processing occurs, step 317. If so, a test at step 323 is performed to determine whether scrolling should occur due to user actuation of the scroll controls for the region. If not, the event was probably a normal selection which is handled by normal processing, step 317, for the directory tree. If the event was a scroll command, the scrollable region is scrolled, leaving the remainder of the tree in place, step 325. The process stops, step 327, when the directory tree is closed.

In the flow diagram, the normal processing steps, i.e. selection and dragging a selected item are not depicted as they are very similar to the normal operations associated with the directory tree. Some of the optional steps such as resizing the size of the scrollable region in response to user manipulation of the top and/or bottom lines are also not depicted.

It is preferred that the present invention provides similar techniques to that of existing GUIs so that a user's expectations are met. The present invention provides changes to a directory structure which primarily differ in the nature of its presentation. No manipulations are performed on the actual organizational structure within the memory of the computer system.

The present invention finds application in an operating system of a computer to manage files and directories as well as software module associated with the hardware. The invention can also be used in a variety of other arenas. It can be used in a structured document editors for a markup language such as XML. As a structured document is like a big nested data structure, it is often shown as a tree. If a particular nested substructure is larger than a specified size, the scrollable region of the present invention can be invoked.

The invention could also be utilized in a GUI editors whore a layout for a graphical interface can be thought of as a nested structure, starting with the outer window layer and working into regions of the window and ultimately to individual elements, e.g., (text fields, buttons, etc.) A GUI editor which presents the structure in tree form could be enhanced by the invention.

The invention can also be extended to Lightweight Directory Access Protocol (LDAP) on-line directories. LDAP is a popular protocol and emerging Internet standard based on organizing information in hierarchies according to well-defined layers of grouping. For example, LDAP directories of people usually have a hierarchy like "country", "org type", "org name", "division", "department", "person". The directory is usually made available to a network so that a number of users can access the data. Thus, the invention will generally be useful in an application in which data is often represented on screen by a tree or nested structure.

While the invention has been particularly shown and described with reference to a preferred embodiment, it will be understood by those skilled in the art that various changes in form and detail may be made therein without departing from the spirit and scope of the invention.

What is claimed is:

1. A method for managing a directory tree within a graphical user interface, comprising the steps of:
    displaying a directory tree, in a substantially columnar form wherein subsections of the tree are demarcated by indentation and are indented by an amount less than an average width of members within a subsection;
    detecting a command to expand a subsection of the directory tree;
    determining whether criteria are met for displaying the subsection in a scrollable region within the directory tree; and
    presenting the subsection in the scrollable region if the criteria are met, wherein the scrollable region is presented within the directory tree at the indentation assigned to the subsection, so that a greater number of members of the directory tree outside the subsection can be displayed within the graphical user interface.

2. The method as recited in claim 1, wherein one criteria is whether the subsection has more than a predetermined number of members.

3. The method as recited in claim 1, wherein one criteria is whether all members of a root node directory of the tree can be displayed if the subsection is fully expanded.

4. The method as recited in claim 1, wherein one criteria is whether the subsection is at a predetermined depth in the directory tree structure.

5. The method as recited in claim 1, wherein the scrollable region is presented with its own scrolling control for independently scrolling the scrollable region with respect to higher levels of the directory tree.

6. The method as recited in claim 1, wherein the scrollable region is resizable according to user input manipulations.

7. The method as recited in claim 6, wherein members outside the scollable region are relocated responsive to a resizing action on the scrollable region.

8. The method as recited in claim 1, further comprising the steps of:
    detecting a command to expand a lower level subsection of the directory tree within the scrollable region;
    determining whether criteria are met for displaying the lower level subsection in a lower level scrollable region;
    collapsing the scrollable region; and
    presenting the lower level subsection in the lower level scrollable region.

9. The method as recited in claim 1, wherein the directory tree is an operating system interface used to show a user an accessible set of files on a computer system.

10. The method as recited in claim 1, wherein the directory tree is an interface to a network directory accessible to a plurality of users via a network.

11. A system including process, memory, display and input devices for managing a directory tree within a graphical user interface, comprising:
    means for displaying a directory tree on the display, in a substantially columnar form wherein subsections of the tree are demarcated by indentation and are indented by an amount less than an average width of members within a subsection;
    means for detecting a command to expand a subsection of the directory tree;
    means for determining whether criteria are met for displaying the subsection in a scollable region within the directory tree; and
    means for presenting the subsection in the scrollable region if the criteria are met, wherein the scrollable region is presented within the directory tree at the indentation assigned to the subsection, so that a greater number of members of the directory tree outside the subsection can be displayed within the graphical user interface.

12. The system as recited in claim 11, wherein one criteria is whether the subsection has more than a predetermined number of members.

13. The system as recited in claim 11, wherein one criteria is whether all members or a root node directory of the tree can be displayed if the subsection fully expanded.

14. The system as recited in claim 11, wherein at least one member of the subsection is modified to provide an indication that more information can be scrolled into the scrollable region.

15. The system as recited in claim 11, wherein the scrollable region is presented with its own scrolling control for independently scrolling the scrollable region with respect to higher levels of the directory tree.

16. The system as recited in claim 11, wherein the scrollable region is resizable according to user input manipulations.

17. the system as recited in claim 16, wherein members outside the scrollable region are relocated responsive to a resizing action on the scrollable region.

18. A computer program product in a computer usable medium for managing a directory tree within a graphical user interface, comprising:
    means for displaying a directory tree on the display, in a substantially columnar form wherein subsections of the tree are demarcated by indentation and are indented by an amount less than an average width of members within a subsection
    means for detecting a command to expand a subsection of the directory tree;
    means for determining whether criteria are met for displaying the subsection in a scrollable region within the directory tree; and
    means for presenting the subsection in the scrollable region if the criteria are met, wherein the scrollable region is presented within the directory tree at the indentation assigned to the subsection, so that a greater number of members of the directory tree outside the subsection can be displayed within the graphical user interface.

19. The product as recited in claim 18, wherein one criteria is whether the subsection has more than predetermined number of members.

20. The product as recited in claim 18, wherein one criteria is whether all members of a root node directory of the tree can be displayed if the subsection is fully expanded.

21. The product as recited in claim 18, wherein one criteria is a ratio of a display space allocated to displaying the subsection compared to a remainder whether the subsection is at a predetermined depth in the directory tree structure.

22. The product as recited in claim 18, wherein the scrollable region is presented with its own scrolling control for independently scrolling the scrollable region with respects to higher levels of the directory tree.

23. The product as recited in claim 18, wherein the scrollable region is resizable to user input manipulations.

24. The product as recited in claim 23, wherein members outside the scrollable region are relocated responsive to a resizing action on the scrollable region.

25. A method for managing a directory tree within a graphical user interface, comprising the steps of:

presenting the directory tree within a scrollable window, in a substantially columnar form wherein subdirectories of the tree are demarcated by indentation and are indented by an amount less than an average width of members within a subdirectory;

responsive to a command to expand a subdirectory within the directory tree, presenting the subdirectory within a separate scrollable region within the directory tree wherein the scrollable region is presented within the directory tree at the indentation assigned to the subdirectory;

wherein scrolling the subdirectory within the scrollable region does into move directory members outside the scrollable region.

26. The method as recited in claim 25 wherein scrolling the directory tree within the scrollable window moves the position of the scrollable region with the movement of the directory tree.

* * * * *

UNITED STATES PATENT AND TRADEMARK OFFICE
CERTIFICATE OF CORRECTION

PATENT NO.   : 6,448,985 B1
DATED        : September 10, 2002
INVENTOR(S)  : McNally It is certified that error appears in the above-identified patent and that said Letters Patent is hereby corrected as shown below:

Column 5,
Line 24, please delete "FIG. 2" and insert FIGS. 2A-2B --;
Line 41, please delete "FIGS. 3A-3B" and insert -- FIGS. 3A-3D --;

Column 6,
Line 66, please delete "FIGS. 4B-4B" and insert -- FIGS. 4A-4B --; and Column 9,
Line 6, please delete "whore" and insert -- where --.

Signed and Sealed this

Twenty-eighth Day of January, 2003

JAMES E. ROGAN
*Director of the United States Patent and Trademark Office*